Sept. 8, 1970          J. B. PANSMITH          3,526,963

RADAR-NAVIGATION APPARATUS

Filed April 22, 1968          10 Sheets-Sheet 1

INVENTOR.
JOHN B. PANSMITH

BY

Sept. 8, 1970

J. B. PANSMITH 3,526,963

RADAR-NAVIGATION APPARATUS

Filed April 22, 1968

*INVENTOR.*
JOHN B. PANSMITH

BY

United States Patent Office 3,526,963
Patented Sept. 8, 1970

3,526,963
RADAR-NAVIGATION APPARATUS
John B. Pansmith, West Islip, N.Y., assignor to Pansmith, Inc., Hauppauge, N.Y., a corporation of Delaware
Filed Apr. 22, 1968, Ser. No. 723,210
Int. Cl. B431 5/00
U.S. Cl. 33—1                                    6 Claims

ABSTRACT OF THE DISCLOSURE

This invention is concerned essentially with radar navigation, embracing unique apparatus for and methods of radar navigation, wherein a course line of a radar-equipped vessel is marked on a plotting sheet including successive positions of the radar-equipped vessel; and corresponding successive positions of the other vessel are marked on the plotting sheet, so that the true or actual courses and speeds of the radar-equipped and other vessels are visually obvious to the operator.

BACKGROUND OF THE INVENTION

As is well known to those versed in the art, collisions and other accidents occurring to land, sea and air vehicles may often have been avoided by proper use of radar-navigation equipment. The actual course and speed of other vessels or vehicles are often desirable for other purposes, such as locating and tracking enemy targets or vehicular traffic. However, such equipment as now provided and the methods of operation now employed make operation quite difficult and tedious. This results in radar-equipped vessels not using their equipment to full advantage, sometimes by lack of properly trained personnel, and other times by reluctance of properly trained personnel to apply the necessary tedious effort over long periods of time.

SUMMARY

Accordingly, it is an important object of the present invention to provide a method and apparatus for radar navigation which is extremely simple to operate, requiring little time and effort, being highly versatile and accurate in use, and affording a clarity of results even to relatively unskilled operators.

It is a more particular object of the present invention to provide a radar-navigation method and apparatus which requires no knowledge of mathematics, nor complicated maneuvering boards or difficult memory operations.

It is a further object of the present invention to provide a radar-plotting method and apparatus which expeditiously shows a true navigational plot of actual positions, courses and speeds of all vessels in their actual relationship and all in the same scale, regardless of the number of vessels involved and without the need for complicated vector diagrams, all in a matter of seconds.

It is a further object of the present invention to provide a radar-plotting method and apparatus of the type described wherein the results are highly accurate, within the limitations of the radar equipment, which is capable of use under substantially all navigational conditions, and wherein possibilities of error are obviated or minimized, all with unskilled persons after a short instruction period usually one hour or less.

It is still another object of the present invention to provide a radar-plotting method and apparatus having the advantageous characteristics mentioned in the preceding paragrphs, which presents to the observer an actual graphic representation of all vessels in their proper aspect, showing bow, beam and stern along their respective course lines.

Another object is to replace the present complicated method commonly known as Relative Motion plotting with a True motion or Geographic plot which is familiar and well understood to all versed in the art of navigation.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

DESCRIPTION OF THE PREFERRED EMBODIMENTS

Figure 1:
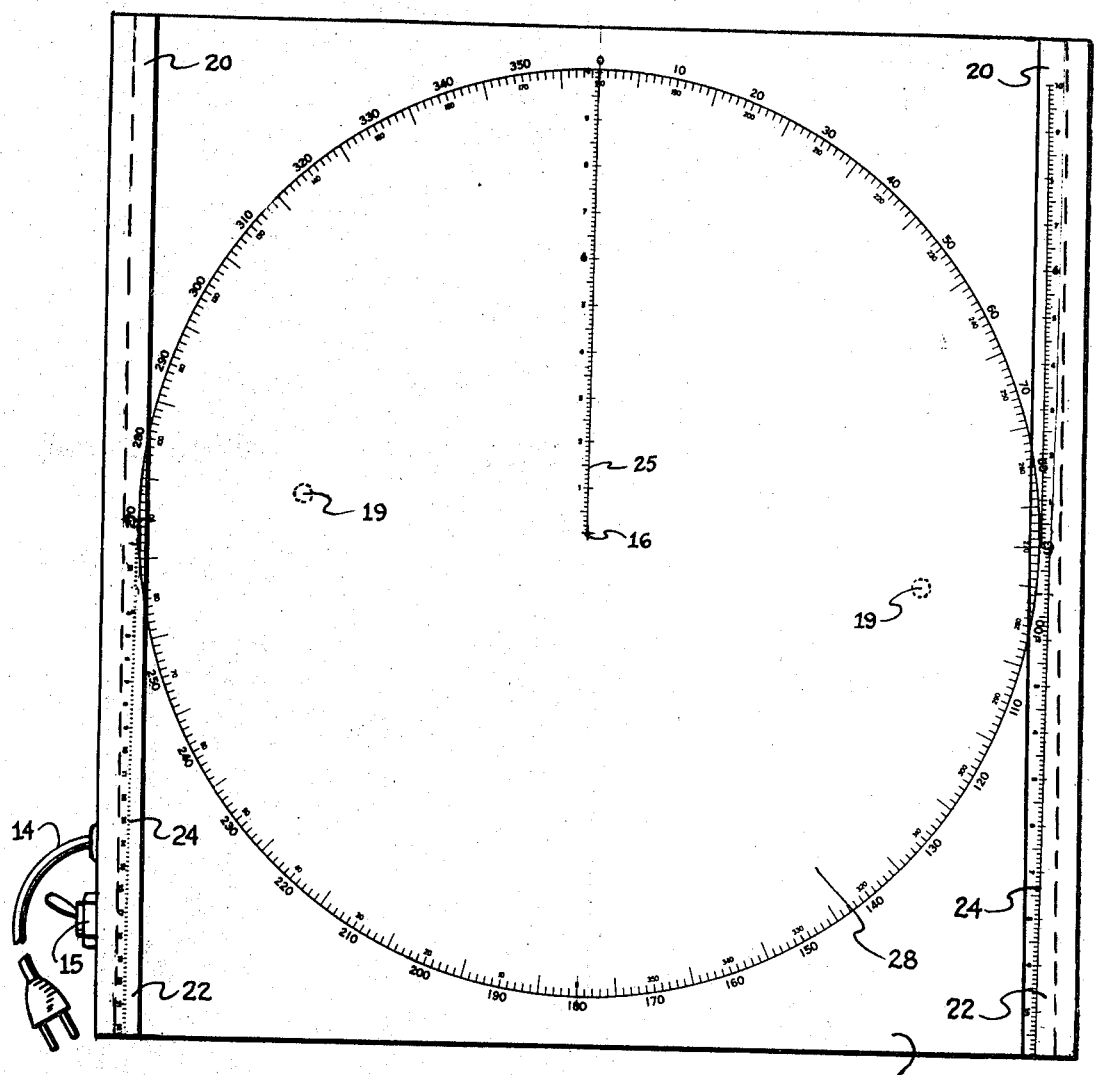
FIG. 1 is a top plan view showing apparatus of the present invention for radar navigation.
Figure 2:
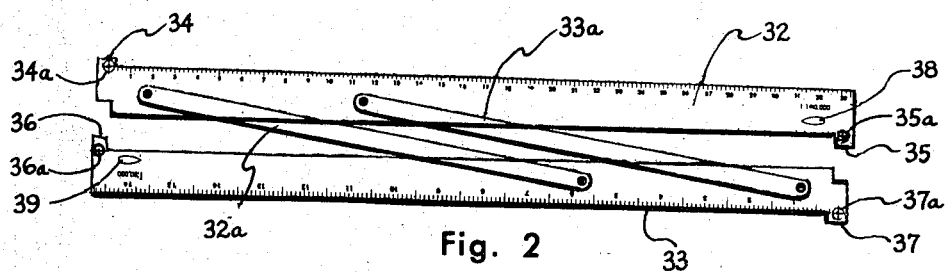
FIG. 2 is a top plan view showing a parallel rule for use with the apparatus of this invention.
Figure 3:
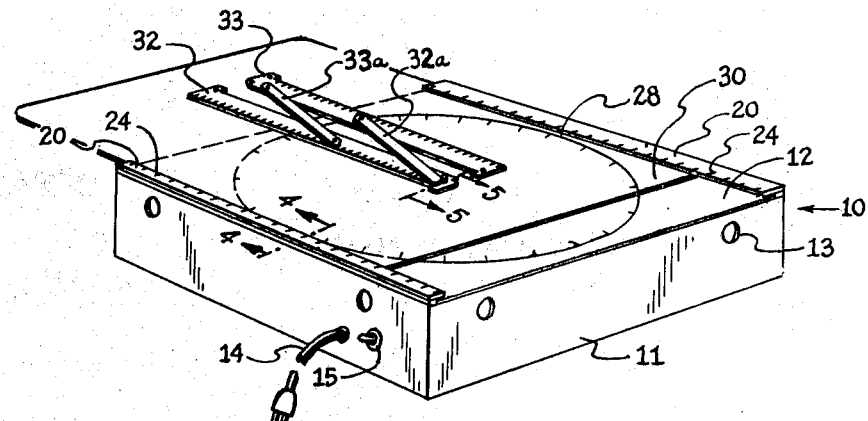
FIG. 3 is a top perspective view showing apparatus of the present invention for radar navigation.
Figure 4:
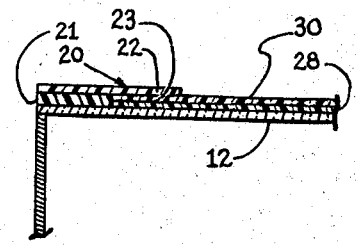
FIGS. 4 and 5 are partial sectional elevational views taken respectively along the lines 4—4 and 5—5 of FIG. 3.
Figure 5:
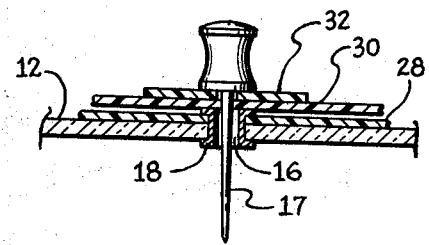

Referring now more particularly to the drawings, and specifically to FIGS. 1–5 thereof, a base is there generally designated 10 and may include a box 11 of generally flat, substantially rectangular or square configuration in plan and having its upper wall 12, see FIGS. 3, 4, and 5, of a light-transmitting material, such as ground glass, frosted plastic or the like. Interiorly of the box 11 are mounted suitable illuminating means, such as lamps (not shown) which may be vented as by openings 13, while a supply conductor 14 extends from the lamps exteriorly of the base 10 for connection to a power source. Connected in the electric circuit of the lamps and supply conductor 14 may be an on-off switch 15, best seen in FIGS. 1 and 3, for selectively energizing and de-energizing the lamps. Generally centrally of the base top wall 12 there may be formed a thru opening or hole 16 for receiving a removable pivot pin 17 for reasons which will become apparent hereinafter.

Mounted on the top wall 12 of the base 10, along opposite side margins, are parallel guide means 20. Each of the guide means 20 may include an elongate spacer strip 21 extending along a respective edge of the base top wall 12, and a cover strip 22 extending longitudinally along and overlying the adjacent spacer strip, and extending laterally inwardly therebeyond to define an inwardly extending groove 23. Thus, the guide means 20 provides a laterally spaced, generally parallel pair of facing grooves 23. On the upper sides of each cover strip 22 may be provided a scale 24 suitably marked for indicating mileage, time units, or velocity. In addition, the top wall 12 is provided with a course line 25 which may be scaled, by suitable markings on the light-transmitting top wall 12 indicating mileage, time units or velocity and extending generally from the center or hole 16 of the top wall radially outward in parallelism with and between the guide means 20. The markings of top-wall scale 25 are advantageously opaque.

A circular sheet 28 rests on the upper side of top wall 12, the sheet advantageously being of light-transmitting or transparent material, such as suitable plastic or the like, and having opposite peripheral edge portions extending into respective grooves 23 of guide means 20. Further, the circular sheet 28 is provided with azimuth circle markings and their reciprocals, advantageously opaque, extending about its marginal edge in the manner of angular-degree graduations, so that the sheet 28 defines a compass rose. The compass rose 28 is selectively rotatable to any desired angular position of rotation about its center which may be secured by a grommet 18 to the center hole 16 of top wall 12; and further, spots of pressure-sensitive adhesive 19 may be employed on the underside of compass rose 28 for releasably retaining the compass rose in a selected position on its angular rotation.

Figure 6:
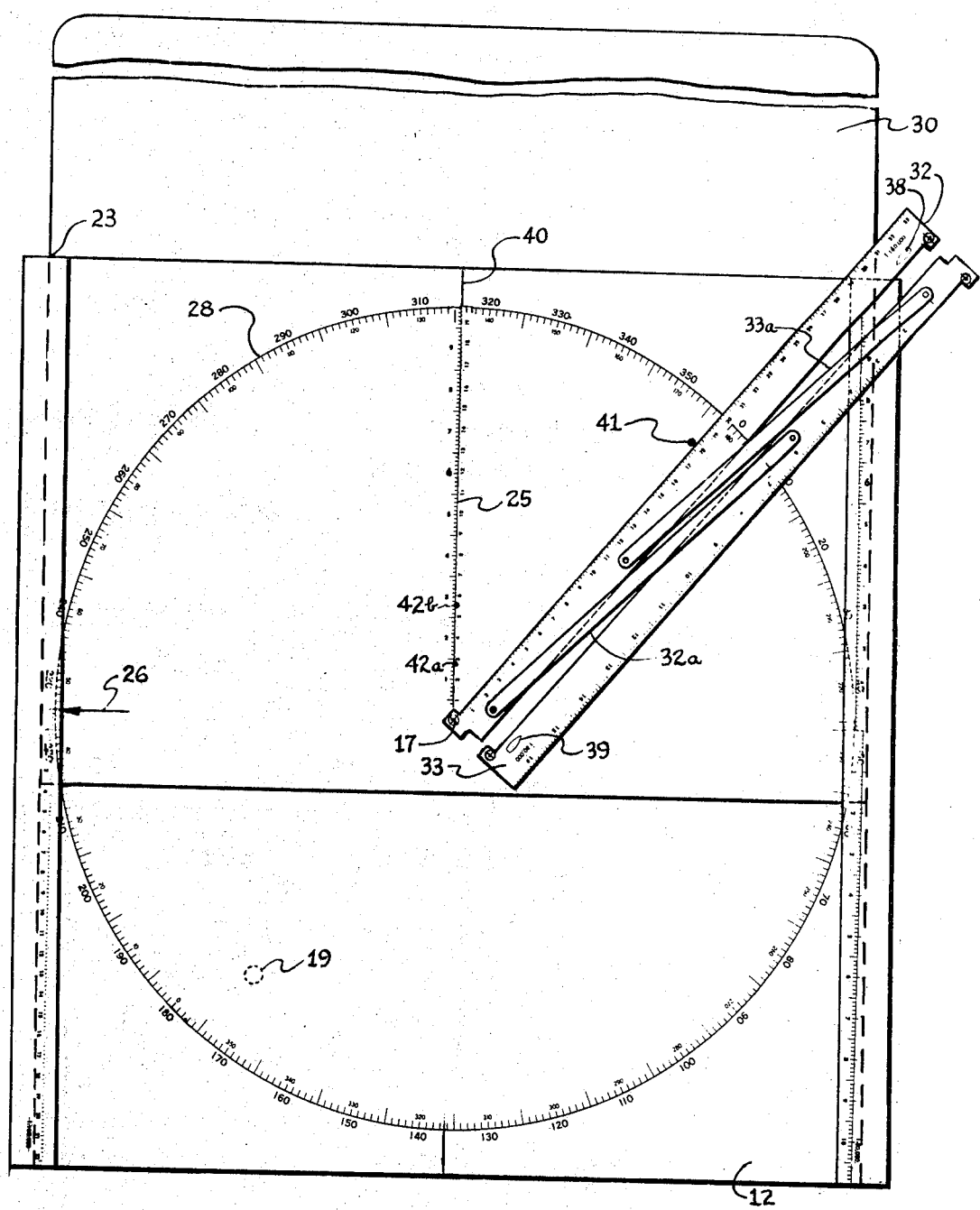
FIG. 6 is a top plan view showing an initial stage in the instant method of radar plotting.

Overlying the compass rose 28 is a plotting sheet 30, better shown on FIG. 6, which may be of any suitable light transmitting sheet material, such as strong tissue paper, acetate plastic or the like, and has its opposite side margins engaged in respective grooves 23, so that the plotting sheet 30 is mounted for linear translation parallel to the guide means 20 and scale 25. Its surface may be written upon and erased at will. As will be understood, the line 25 is located to represent the course line of the plotter's position or vessel. The visibility of the compass rose and marking is enhanced due to the light-permeable characteristics of top wall 12, compass rose 28 and plotting sheet 30. It is also visible without the underlying light source, which use is for night plotting in darkness with red light to prevent loss of night vision.

The apparatus of the instant invention further includes a pair of parallel rules 32 and 33 shown in FIG. 2, connected together by parallel links 32a and 33a in the manner of a four-bar parallel linkage. The rules 32 and 33 are each provided along both their inner and outer edges with various scales for facilitating the determination of mileage and speeds and other computations. Further, the rule 32 is provided at opposite ends with a pair of laterally oppositely extending tabs 34 and 35, each having an aperture or opening, 34a and 35a respectively, for selectively receiving the pivot pin 17 at a location along the respective rule edge at the zero point of a scale. The rule 33 is similarly provided at opposite ends with a pair of laterally oppositely outstanding tabs 36 and 37, also each having an opening or aperture, 36a and 37a, respectively, along a respective scale edge and at a scale zero point. The adjacent edges of rules 32 and 33 may be notched or cut away to receive tabs of the other rule in a closed position of the parallel rules. In addition, the rules 32 and 33 may be formed with thru openings, as at 38 and 39 which assume the plan configuration of a vessel and thereby provide templates for marking vessels on the plotting sheet 30, as will appear presently. The parallel rules 32 and 33 provide means to draw range, bearing and course lines of other ships and to generally plot fixed objects.

The method of the instant invention may be initiated, as shown in FIG. 6, with the rotatable compass rose 28 having its azimuth circle located in accordance with the course of the radar-equipped vessel at lubber line 40. From the standard compass of the radar-equipped vessel it is determined that the vessel is proceeding along a course of 316 degrees, and the azimuth circle 28 is rotated to place the 316 degree mark along the lubber line or scale 40 of the base top wall 12. The compass rose 28 may be releasably retained in this position by spots of pressure-sensitive adhesive 19 on its underside, if desired. The base top wall 12 may be provided with a preferably opaque lubber line or index mark 40, as an extension of the course line scale 25, to facilitate accurate location of the compass rose 28.

Figure 7:
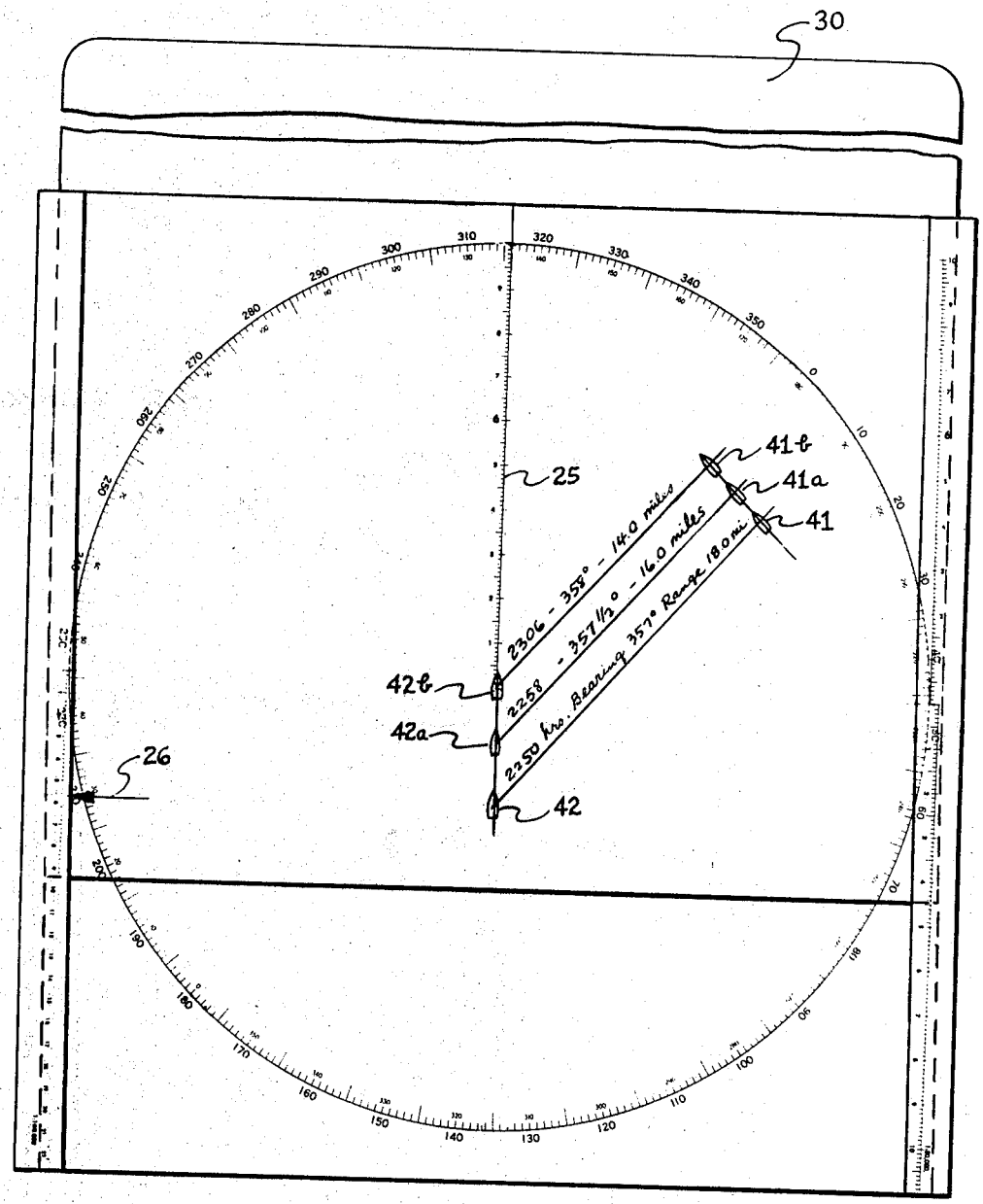
FIG. 7 is a top plan view similar to FIG. 6, showing a later stage in the instant method.

It will now be understood that the center line 25 now represents the true course of 316 degrees of the radar-equipped vessel. With a plotting sheet 30 in place on the compass rose or azimuth circle 28, the side edges or margins of the plotting sheet being engaged in respective grooves 23, the plotting sheet is positioned above center for successive downward movements, as will appear presently. From the radar screen, another vessel is observed at a bearing of 357 degrees and a range of 18.0 miles, the time of observation in this illustration being 2250 hours, which may be noted on the sheet 30 and an index arrow 26 may be placed at the selected scale to indicate the mileage covered by the radar equipped ship as it progresses. The parallel rules 32, 33, are located with one apertured tab 34 at the center of azimuth circle 28 with pivot pin 17 piercing sheet 30 and inserted in grommet 18 encircling hole 16. The outer edge scale of rule 32 is then swung to 357 degrees. The position of the observed vessel is indicated along the 357 degree line at 41, a distance corresponding to the 18.0 mile distance or range observed on the radar screen. This position of the other vessel may be marked, as shown in FIG. 7, at 42, as of the time of observation; that is, 2250 hours, bearing 357 degrees, and distance 18.0 miles.

After the first observation made at 2250 hours, the navigator may decide to make two additional observations at 8-minute intervals. The speed of the radar-equipped vessel is known to be 21.0 knots, so that this vessel travels 2.8 nautical miles in 8 minutes. Accordingly, the positions of the radar-equipped vessel may be marked along the course line scale 25 for the next two observations, as at 42a for the second observation and 42b for the third observation. By employing the template openings 38 or 39, the operator may mark the outline of the radar-equipped vessel about each plotted position 42, 42a and 42b, as best seen in FIG. 7.

The plotting sheet 30 is then shifted downward to place the radar-equipped vessel position 42a at the center of the compass rose 28, and after an interval of 8 minutes, at 2258 hours, an observation is made of the other vessel and its position plotted on sheet 30 in the same manner as described above. After another 8-minute interval, at 2306 hours, the above-described procedure is repeated for position 42b, which results in the plot of FIG. 7.

Figure 8:
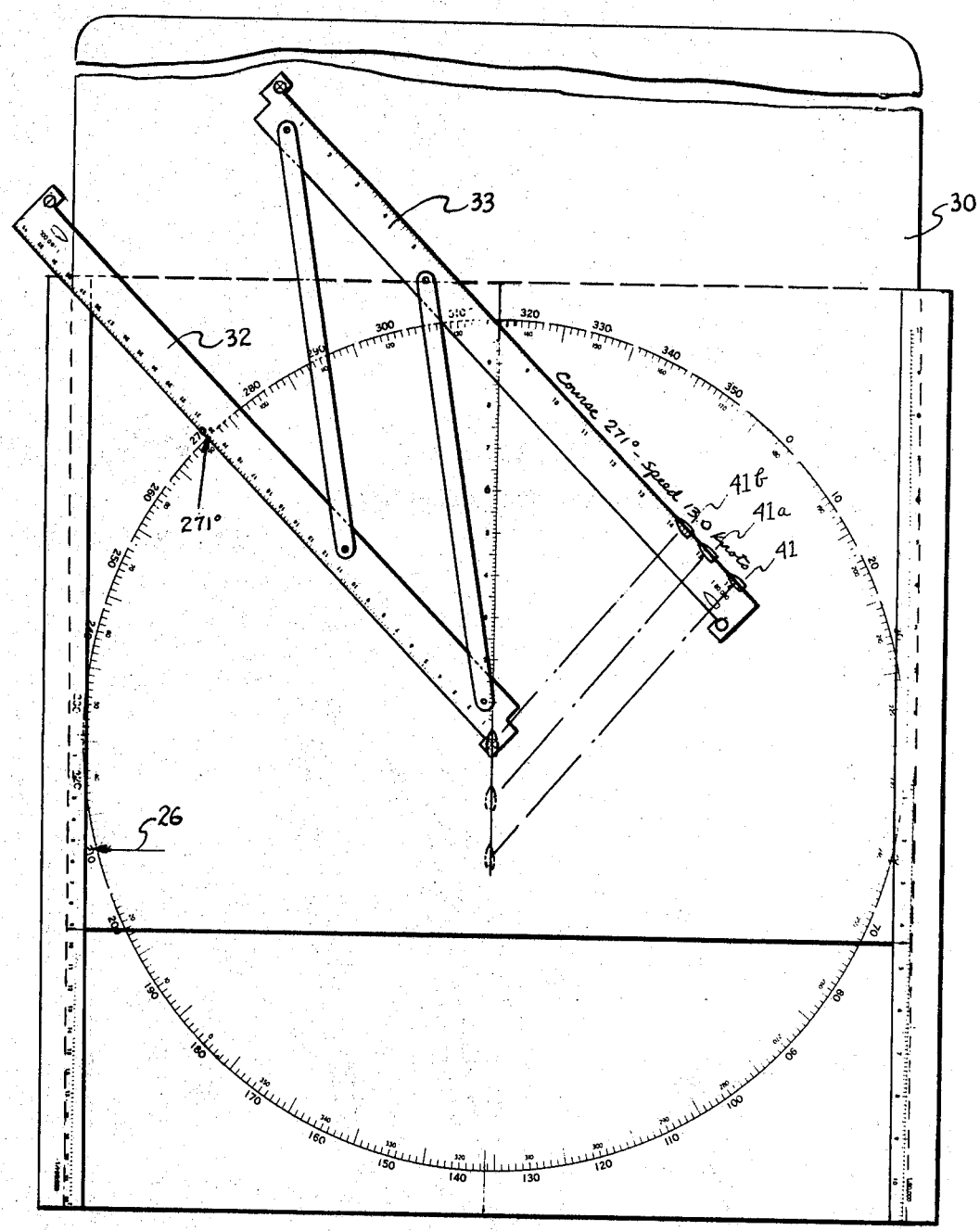
FIG. 8 is a top plan view similar to FIGS. 6 and 7, showing a later stage in the instant method.
Figure 13:
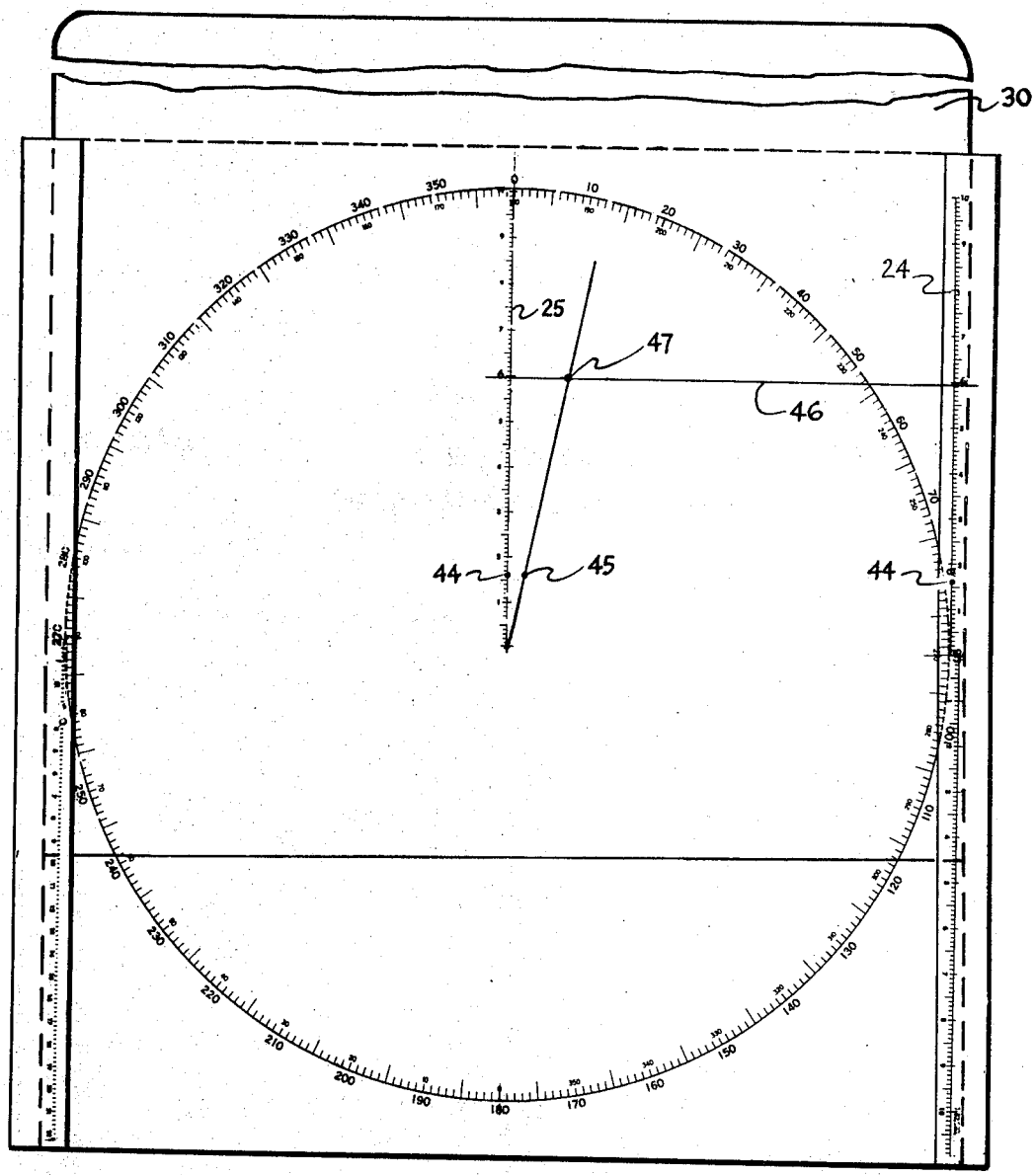
FIG. 13 shows the apparatus of this invention used in connection with a method to graphically resolve time-speed-distance problems.

The direction and speed of the other vessel may then be observed and determined graphically, and the template openings 38, 39 employed to indicate the True heading of the other vessel. By use of the parallel rules 32, 33, extending the same to locate rule 33 along the course of the other vessel with rule 32 extending radially of the compass rose, as best seen in FIG. 8 it will be appreciated that the true course of the other vessel may be observed, at the intersection of the azimuth circle by rule 32, as 271 degrees. The True course of the other vessel may be drawn along the outer edge of parallel rule 33, and may be marked with its true course and speed as shown. The speed of the other vessel may be determined as shown in FIG. 13, if desired, or obtained from a suitable time-speed-distance table, as by observing the distance traveled over the known time from 41 to 41b. As shown in FIGS. 7 and 8, the plotting sheet now presents a clear graphic picture with all pertinent information necessary to make a decision for action required to avoid collision, or to intercept an other vessel, as may be desired.

Figure 9:
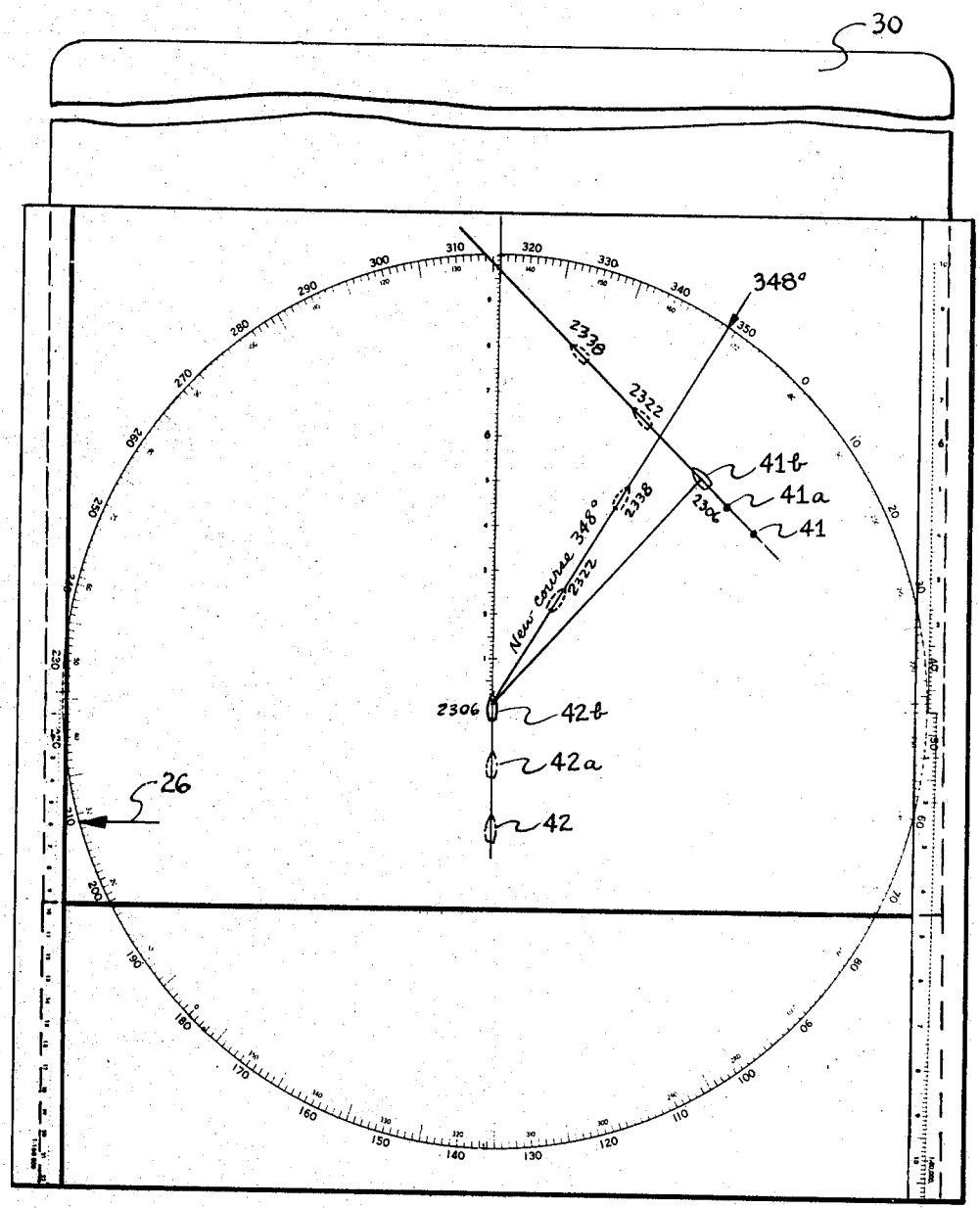
FIG. 9 is a top plan view similar to FIGS. 6–8, illustrating a further step in the instant method.

By way of example, the navigator to avoid collision may decide to turn the radar-equipped vessel to starboard on a new course of 348 degrees at 2306 hours, see FIG. 9. The predicted positions of both vessels may now be made on the plotting sheet 30 at intervals of 16 minutes, which indicates the radar-equipped vessel will pass astern of the other vessel, if both vessels hold their then present course and speed.

Figure 10:
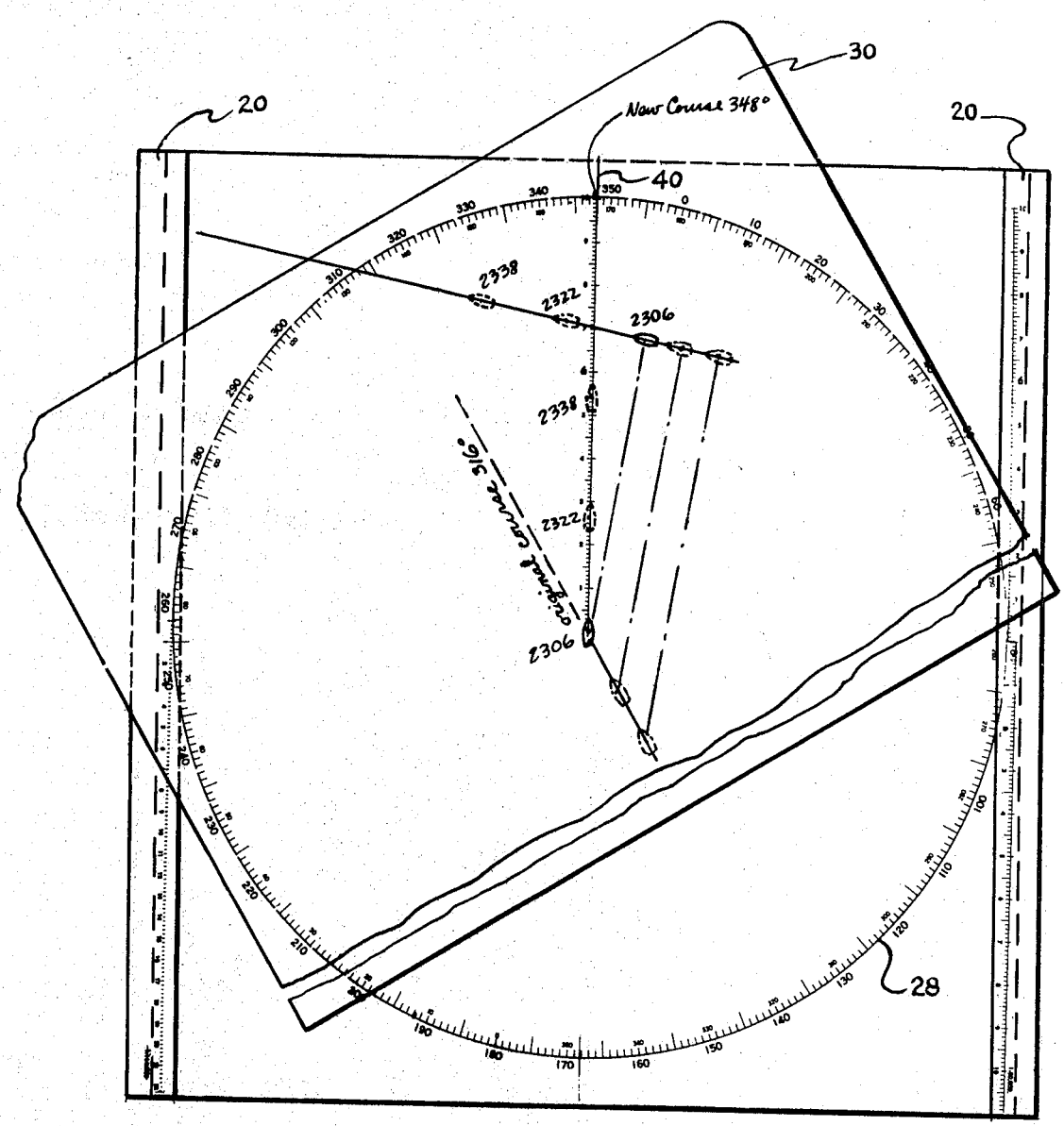
FIG. 10 is a top plan view similar to FIG. 9, showing a further step in the instant method.

In FIG. 10, the plotting sheet 30 has been removed from the side guides 20 and oriented to locate the new course of the radar-equipped vessel along the lubber line of the base, the azimuth circle 28 having been rotated to locate the 348 degree marking at the lubber line 40. The sheet 30 may be held in its new position by ordinary draftsman's tape. Assuming both vessels hold course and speed, the plot now shows actual True relationship and courses of the vessels, with the plotter's radar-equipped vessel in conventional fore and aft position on the course line. Observations are continued until both vessels are clear of each other, and the plotting sheet may be erased and reused, or filed for log records, if desired.

Figure 11:
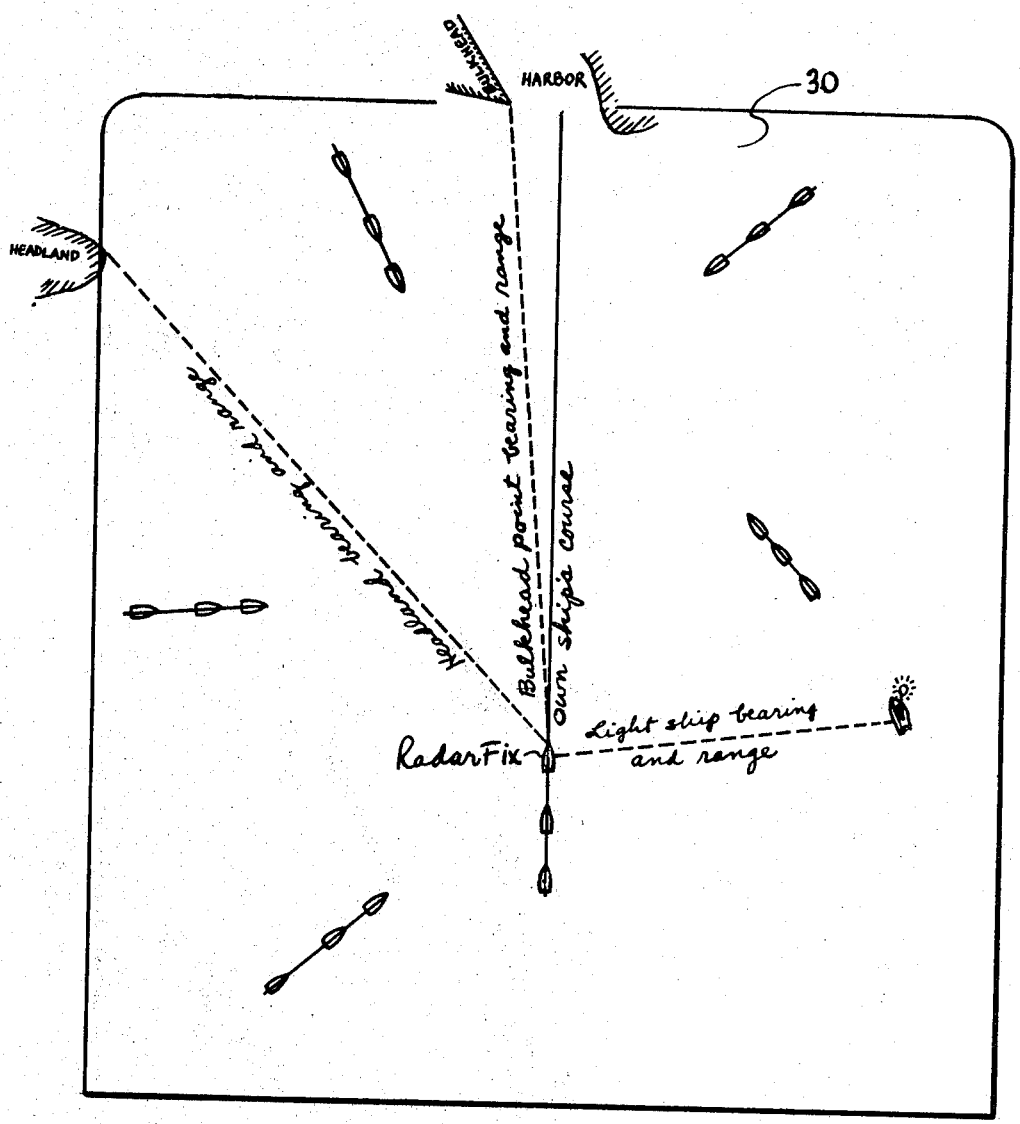
FIG. 11 is a top plan view showing additional useful features of the present invention.

In FIG. 11 is shown a hypothetical situation wherein a multiplicity of other or observed vessels are all being plotted on a plotting sheet 30, indicating the clarity of graphic representation available to the navigator. Bearings and ranges of fixed landmarks and a lightship serve to fix the position of the plotters ship.

Figure 12:
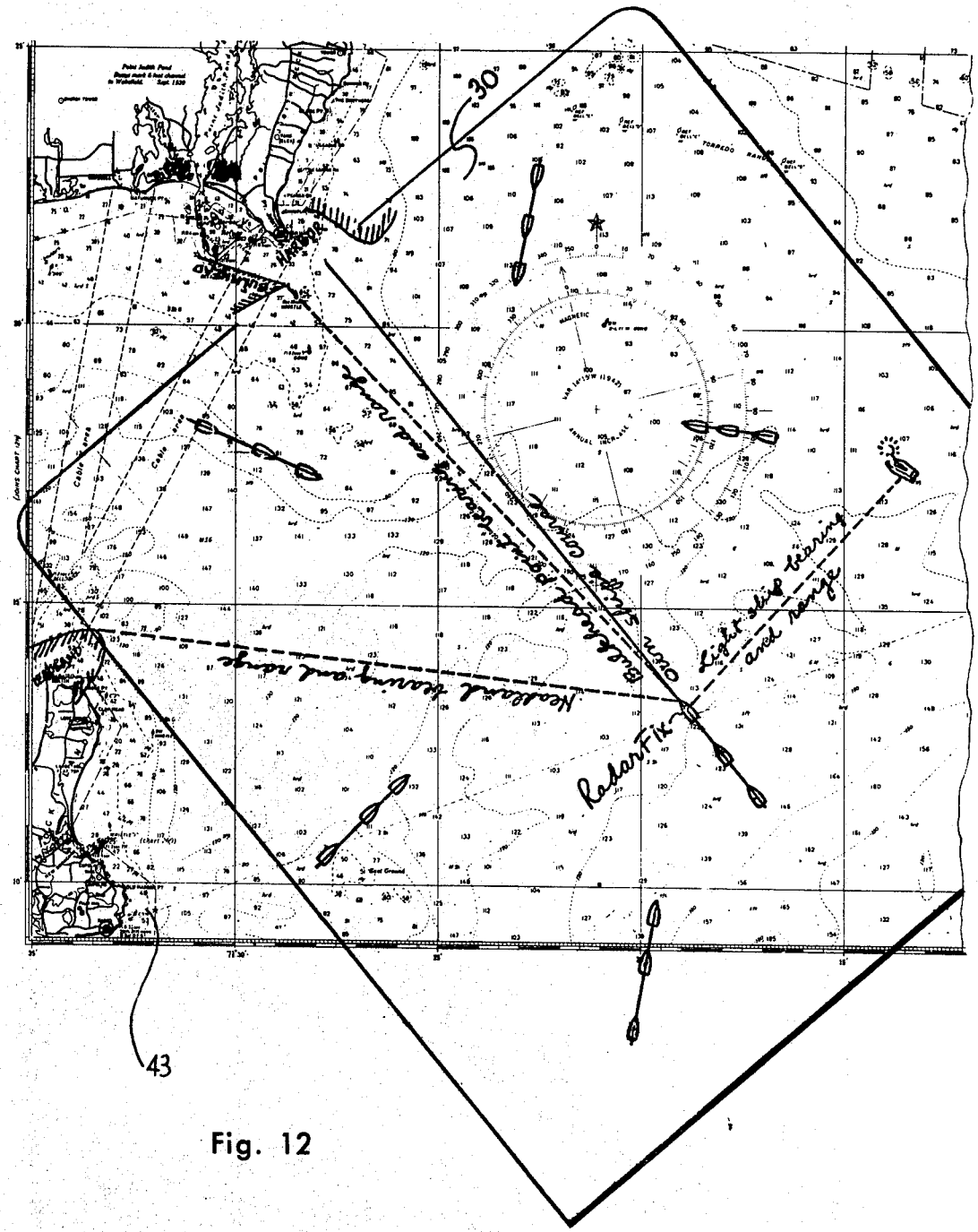
FIG. 12 is a top plan view of the plotting sheet utilizing a means to fix the position of a vessel respective to a standard marine chart.

In FIG. 12 the plotting sheet of FIG. 11, is shown removed from the device and superimposed on a standard marine chart 43 having the same scale as selected for the plot. In this manner, the position of the radar equipped vessel on the chart 43 may be visually observed.

Advantageously, the parallel rule scales are calibrated to the same scales as used on conventional nautical charts. When the plotting sheet 30 is superimposed over such a chart, and the radar-equipped vessel oriented at its radar fixed or dead-reckoning position, the navigator may readily observe and consider any charted navigational hazards that may influence action to be taken for the safety of the vessel.

A method and means for solving Time, Speed and Distance problems graphically with the device of this invention is illustrated in FIG. 13.

As an example: to determine Speed of the observed vessel shown on FIG. 8. (Known factors: Ship travelled 3.5 miles in 16 minutes as depicted.) Insert a plotting sheet 30. Take parallel rules 32–33, select proper scale (1:80,000) and designate course line 25 and right side scales 24 as minute units of time, align zero mark of rule on the 16 (minutes) marks 44, of scales 25 and 24. Each increment unit on rule 33 indicates one nautical mile. At the 3.5 mile point of rule 33, place a pencilled dot 45 on the plotting sheet 30. Draw a horizontal line 46 thru 6 (60 minutes) on course line 25 and scale 24. Pin the parallel rule 33 at center and draw a line to intersect dot 45 and horizontal line 46. At point of intersection, place another dot 47. Take parallel rule (using same scale at all times) and measure the distance from the mark 6 of line 25 to dot 47. This indicates the Speed (13.0 kts.). As will be apparent, when any two factors of Time, Speed and Distance are known, the missing factor may be obtained as demonstrated in FIG. 13.

Further, it is to be noted that the indices on scales are as commonly used on a slide rule: i.e. 1 unit can be read as .01, .10, 1.0, 10., 100., etc. and the corresponding decimal point is carried thru on all readings in the problem.

From the foregoing, it is seen that the present invention provides a method and apparatus for radar plotting which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Radar-plotting apparatus comprising a base, a rotary compass rose on said base, a transparent plotting sheet, a guide means on said base for constraining said transparent plotting sheet overlying said compass rose to linear translation for plotting on said sheet successive positions on a course line of the radar-equipped vessel and corresponding positions of the other vessel, and at least a pair of parallel rules positioned on said plotting sheet and selectively locatable through the positions of said other vessel and the center of said compass rose for indicating the True course of said other vessel.

2. Radar-plotting apparatus according to claim 1, in combination with pivot means engaged centrally through said compass rose to constrain the latter to concentric rotation.

3. Radar-plotting apparatus according to claim 2, at least one of said parallel rules having a pivot-receiving opening in alignment with one edge thereof, for rotation of said rules about the center of said compass rose.

4. Radar-plotting apparatus according to claim 1, said compass rose and the upper surface of said base being light permeable, and illuminating means in said base for transmitting light upwardly from said base through said compass rose and an overlying plotting sheet.

5. Radar-plotting apparatus according to claim 4, in combination with a graduated scale marked on said base along the course line to facilitate plotting successive positions of the radar-equipped vessel, said scale markings being visible through the compass rose and plotting sheet.

6. Radar-plotting apparatus according to claim 1, said parallel rules each comprising a stencil for plotting positions and having scales along their edges corresponding to distances and velocities.

References Cited

UNITED STATES PATENTS

| 2,834,110 | 5/1958 | Malakoff. |
| 2,979,821 | 4/1961 | Tengwall. |
| 2,991,555 | 7/1961 | Cambiaso. |
| 3,345,751 | 10/1967 | Barzee et al. _____ 33—78 |

FOREIGN PATENTS 619,252   3/1961   Italy.

WILLIAM D. MARTIN, Jr., Primary Examiner

U.S. Cl. X.R.

33—76, 108